United States Patent Office 3,444,185
Patented May 13, 1969

3,444,185
PROCESS OF PREPARING 1-(2-OXO 1-PYRROLI-
DINO) 4-(1 - PYRROLIDINO)-BUT-2-YNE AND
SALTS THEREOF
Pierre P. G. Nau, Argenteuil, France, assignor to Societe
Civile Auguil, Paris, France, a French body corporate
No Drawing. Continuation-in-part of application Ser. No.
458,440, May 24, 1965. This application Nov. 28, 1966,
Ser. No. 597,485
Claims priority, application France, May 26, 1964,
975,856
Int. Cl. C07d 27/74; A61k 27/00
U.S. Cl. 260—326.3          8 Claims

ABSTRACT OF THE DISCLOSURE

Oxotremorine is prepared with improved yields by condensing a propargyl alcohol ester with an alkali metal derivative of pyrrolidone between −80° C. and +25° C. and condensing N-propargyl pyrrolidone thus obtained with formaldehyde and pyrrolidine in the presence of copper ions. Oxotremorine gives with polycarboxylic acids new salts of advantage over the free base.

The present application is a continuation-in-part of my application Ser. No. 458,440 filed May 24, 1965, and now abandoned.

The present invention relates to the preparation of 1-(2-oxo 1-pyrrolidino) 4-(1-pyrrolidino)-but-2-yne, hereinafter termed OPPB for reasons of brevity, and to new salts of this compound.

OPPB is a known chemical compound having the following formula:

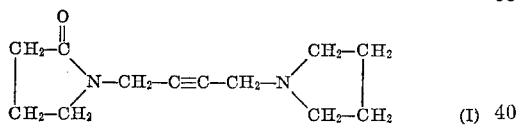

It is a metabolite of 1,4-di-N-pyrrolidino-but-2-yne, known as "Tremorine" from which it is derived by oxidation of the carbon atom at position 2 of one of the pyrrolidine rings. Tremorine and its metabolite OPPB (also called Oxotremorine) have been the subject of research since their administration creates phenomena related to those of Parkinson's disease, which permits studying the remedies for this disease.

OPPB, which is more active and more reliable than Tremorine, is thus now used as a pharmacological tool in screening compounds for anti-Parkinson activity and also in the search for drugs with central and peripheral anticholinergic properties.

OPPB has been for the first time identified and prepared by A. K. Cho, W. L. Haslett and D. J. Jenden (Biochemical and Biophysical Research Communications 1961, 5 (4), 276–279) who obtained it by reacting the sodium derivative of pyrrolidone (II) on propargyl bromide which thus gives N-propargyl pyrrolidone (III) which when condensed in accordance with Mannich reaction with trioxymethylene and pyrrolidine, gives the OPPB.

The reaction diagram of this process can be represented as follows:

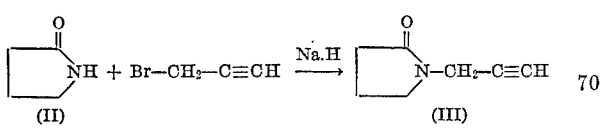

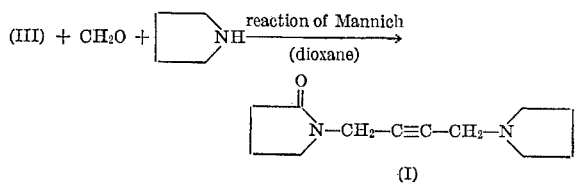

However, the process carried out by these authors only gives small amounts of the final product in a rather impure state. It is moreover difficult to employ on a commercial scale since, apart from its low yields, it involves a costly method for purifying the compound: column chromatography.

The rapidly increasing use of OPPB as a pharmacological tool has created the need of an improved process for preparing this compound. One object of the invention is to provide such a process capable of affording increased yields and of being applied on a commercial scale.

The process according to the invention for preparing OPPB is a two stage process of the aforementioned type, each of the stages being, however, improved in such manner as to render the whole process reliable and operative on a commercial scale. Indeed, previously, the condensation of the first stage between the sodium derivative of pyrrolidone and the propargyl bromide, carried out hot, gave with a mediocre yield a rather impure N-propargyl pyrrolidone described in the literature as a yellow oil becoming black in the course of storage.

Now, it has been discovered according to the invention that by operating cold there is obtained with an excellent yield (80–90%) N-propargyl pyrrolidone in a very pure state and in the form of a perfectly colourless liquid which crystallizes at low temperature and has a melting point of −5° C. (non-corrected value).

According to a first feature of the invention, N-propargyl pyrrolidone is thus prepared by condensing between −80° C. and 25° C. an ester of propargyl alcohol, such as chloride, bromide, iodide, methane sulfonate or p. toluene-sulfonate, with an alkali metal derivative of pyrrolidone, such as the derivatives of lithium, potassium or sodium, the ester of propargyl alcohol and the derivative of pyrrolidone being added to each other at a temperature not exceeding 0° C. The reaction lasts from one to several days, depending on the ester employed. It is effected in an inert aromatic solvent such as benzene, toluene, xylene, tetraline or an ether oxide, such as di-ethyl ether, di-isopropyl ether, tetrahydrofurane or dioxane. The essential precaution to take is to employ a perfectly dry solvent.

As concerns the second stage of the process, the condensation of N-propargyl pyrrolidone, pyrrolidine and a source of formaldehyde is carried out, according to the invention, in the presence of a catalyst constituted by a copper compound capable of liberating copper ions. It has indeed been discovered that the presence of this catalyst permits considerably increasing the yield of the reaction and results in a much purer product.

As copper compounds of utility as catalysts there may be mentioned the cupric and cuprous salts and oxides and, for example, without the following list being intended to limit in any way the scope of the invention: acetate, basic acetate, bromide, chloride, ammoniacal chloride, formate, nitrate, oxide, sulfate and p.toluene-sulfonate of copper II, acetate, bromide, chloride, cyanide, iodide, oxide and thiocyanate of copper I.

The amount of copper compound is not critical and can vary between 0.1% and 10% by weight of the propargyl pyrrolidone, an amount of about 2–3% by weight usually being satisfactory.

Moreover, a general feature of the catalyst according to the invention is that it permits obtaining OPPB with a high yield over a very large range of operational conditions. Thus, the conditions of concentration, temperature and pH are without great influence on the catalyst activity. Likewise, the formaldehyde can be employed in the gaseous solution or in the polymerized form (trioxymethylene or paraformaldehyde). Further, apart from the previously recommended dioxane, there may be employed as the reaction solvent any other appropriate solvent such as diluted acetic acid. This great flexibility of the process is a further advantage of the invention over the prior art.

N-propargyl pyrrolidone obtained in the first stage is an N-substituted lactam and consequently has no acido-basic character. Despite this, it has been discovered that it is capable of giving with certain organic or mineral acids, stoichiometric combinations or adducts. These stoichiometric combinations are formed particularly well with organic dicarboxylic acids such as oxalic, malonic, succinic, glutaric, adipic, fumaric, maleic, tartaric acids, etc. These stoichiometric combinations, also covered by the invention, are of interest since they are crystalline and can be used with advantage in the second stage of the process instead of N-propargyl pyrrolidone which is liquid at room temperature. Moreover, these combinations have a longer shelf-life than N-propargyl pyrrolidone and can thus be stored for a long period before they are used in the second stage of the process. These combinations are soluble in most solvents and in particular in water, alcohols, ether oxides, aromatic hydrocarbons and halogenated solvents. They are much less soluble in aliphatic and alicyclic solvents. They usually result from the combination of one molecule of dicarboxylic acid (A) with two molecules of N-propargyl pyrrolidone (B) and therefore satisfy the formula $AB_2$, as shown hereinafter by the methods of functional analysis.

For its part, 1-(2-oxo 1-pyrrolidino) 4-(1-pyrrolidino)-but-2-yne, or OPPB, has a basic amine function and can consequently product salts with acids. However, the sole salt described up to the present time results from the salification of one molecule of OPPB by one molecule of picrolonic acid, giving a well-crystallized picrolonate in respect of which the applicant has found a melting point of 159–160° C. which is very near to that indicated by Cho, Haslett and Jenden (loc. citat.) (M.P.=157–159° C.).

The use of OPPB as a pharmacological tool, either as the free base or the picrolonate, has given rise to some difficulties.

The free base is liquid and thus difficult to handle. Moreover, it is hygroscopic and liable to be carbonated when exposed to air so that its purity at the moment of use is not easily determined. The picrolonate, on the other hand, is very slightly soluble in water and picrolonic acid has a pharmacological activity of its own, which can interfere with that of OPPB.

Now it has been discovered that salts of OPPB with acids substantially free of pharmacological activity, avoiding these drawbacks, can be prepared and used with advantage as pharmacological tools in screening compounds for anti-Parkinson activity and anticholinergic properties.

These salts, which are easily obtained in the crystalline state, derive from organic dicarboxylic acids such as the oxalic, malonic, succinic, glutaric, adipic, maleic, fumaric, tartaric, itaconic, citraconic acids etc., or from organic tricarboxylic acids, such as citric acid etc.

They usually result from the combination of two molecules of base (B) with three molecules of di-acids (A) and therefore satisfy the formula $A_3B_2$, as shown hereinafter by the methods of functional analysis. This formula is entirely unexpected as it could not be foreseen from the theoretical viewpoint. These salts can be obtained in a very high state of purity, are quite stable and very soluble in water and can thus be handled very easily. They are also soluble in alcohols, slightly soluble in ether oxides, very sightly soluble in aromatic, aliphatic and alicyclic solvents.

The following examples illustrate the invention.

EXAMPLE 1

Preparation of N-propargyl pyrrolidone (a) The following mixture is refluxed while stirring well for one hour:

85 g. of 2-pyrrolidone (one mole), 26.4 g. of sodium hydride—a 50% suspension in mineral oil (1.1 mole)—and 600–700 cc. of anhydrous benzene or toluene.

The mixture is cooled in an ice and salt bath and 131 g. of propargyl bromide (1.1 mole) dissolved in 200 cc. of dry benzene or toluene are added little by little while stirring. The addition is carried out below 0° C. The reaction mixture is allowed to return to room temperature and the stirring is continued for 24 hours. The precipitate of sodium bromide is eliminated by filtration, washed with toluene or benzene, the washings being added to the filtrate.

The solvent is distilled off under a vacuum. Two layers then separate.

The lower layer is withdrawn and fractionated under a vacuum. In this way, 80–90% of N-propargyl pyrrolidone boiling at 86–88° C. under 2 mm. of mercury is obtained. It is a colourless liquid, soluble in water and organic solvents and crystallizes in an ice-salt mixture, its melting point being −5° C. (non-corrected).

(b) The reaction is carried out as at (a) but by using propargyl chloride (82 g., 1.1 mole) instead of propargyl bromide.

The stirring is continued for 48 hours instead of 24 hours. The yields are identical.

EXAMPLE 2

Preparation of stoichiometric combinations of N-propargyl pyrrolidone with dicarboxylic acids (a) With oxalic acid.

3.15 g. of oxalic acid dihydrate (0.025 mole) and 6.2 g. of N-propargyl pyrrolidone (0.050 mole) are dissolved hot in about 300 cc. of anhydrous ether. The mixture is concentrated down to a few cubic centimeters and allowed to crystallize in an ice-salt mixture, 6 g. of product are drained off and crystallized in di-ethyl ether.

In this way, there are obtained beautiful white needles which are very soluble in water and melt at 71–72° C. (non-corrected).

*Analysis.*—Molecular weight (by acidimetry): Calculated for $(C_7H_9NO)_2, C_2H_2O_4$: 336.4. Found: 338.

(b) With fumaric acid.

1.16 g. of fumaric acid (0.01 mole) and 6.2 g. of N-propargyl pyrrolidone are dissolved hot in a few cubic centimetres of methanol. Benzene is added and the methanol is removed by azeotropic distillation. The mixture is allowed to cool and the product is drained and crystallized in ether.

There are thus obtained white crystals which are soluble in water and melt in a pasty manner in the region of 80° C.

The product is more easily characterized by acidimetric titration.

*Analysis.*—Molecular weight (by acidimetry): Calculated for $(C_7H_9NO)_2, C_4H_4O_4$: 362.5. Found: 355.

EXAMPLE 3

Preparation of OPPB (a) A mixture of 3.15 g. of trioxymethylene (0.105 mole), 7.5 g. of pyrrolidine (0.105 mole), 12.3 g. of N-propargyl pyrrolidone (0.1 mole), 0.350 g. of cupric acetate and 50 cc. of dioxane are heated for 24 hours at 80–85° C. in a nitrogen atmosphere. The dioxane is eliminated by distillation under a vacuum and the residue is extracted abundantly with chloroform. By distillation of the chloroform extract there are obtained 11 g. of 1-(2-oxo 1-pyrrolidino) 4-(1-pyrrolidino)-but-2-yne (53%)

boiling at 140–145° C. under 0.75 mm. of mercury.

*Analysis.*—Molecular weight (on a redistilled sample): $BP_{0.25}=121°$ C. Calculated for $C_{12}H_{18}N_2O$: 206.2. Found: 270 (acidimetry).

Infra-red spectrum: band C=O— $5.93\mu$.

Colourless liquid very soluble in water and organic solvents.

(b) 61.5 g. of N-propargyl pyrrolidone (0.5 mole), 36.5 g. of pyrrolidine (0.51 mole), 27.6 g. of acetic acid (0.46 mole), 53 cc. of 30% aqueous formaldehyde (0.53 mole), 1.25 g. of cuprous chloride and 50 cc. of water are heated for four hours at 40–50° C. in a nitrogen atmosphere while stirring mechanically. The mixture is alkalized and extracted abundantly with chloroform. The chloroform extract is distilled under a high vacuum. There are thus obtained 70 g. of 1-(2-oxo 1-pyrrolidino) 4-(1-pyrrolidino)-but-2-yne boiling at 120–122° C. under 0.25 mm. of mercury. Yield=68%.

The product is identical to that described at (a) hereinbefore.

(c) A mixture of 17 g. of N-propargyl pyrrolidone oxalate (prepared as in Example 2a), 7.5 g. of pyrrolidine, 11.2 g. of 30% aqueous formaldehyde, 0.25 g. of cuprous chloride and 10 cc. of water is heated for four hours at 40–50° C. in a nitrogen atmosphere while stirring mechanically. The mixture is alkalized and extracted abundantly with chloroform. The chloroform extract is distilled under a vacuum and there is obtained 14.5 g. (yield 70%) of 1-(2-oxo 1-pyrrolidino) 4-(1-pyrrolidino)-but-2-yne boiling at 124–125° C. under 0.3 mm. of mercury, this product being identical to that described at (a) and (b) hereinbefore.

By way of comparison, the reaction is carried out as indicated at (b) hereinbefore but without cuprous chloride. There are then obtained only a few percent of 1-(2-oxo 1-pyrrolidino) 4-(1-pyrrolidino)-but-2-yne and the major part of the starting constituents are recovered.

EXAMPLE 4

Preparation of the salts of OPPB (a) With oxalic acid.

18.8 g. of oxalic acid dihydrate (0.15 mole) are dissolved in 150 cc. of absolute alcohol, and 20.6 g. of 1-(2-oxo 1-pyrrolidino) 4-(1-pyrrolidino)-but-2-yne (0.10 mole) dissolved in an equal amount of alcohol are added. Isopropyl ether is added and the mixture concentrated hot until the start of crystallization.

The mixture is allowed to cool and the product is drained and recrystallized in absolute alcohol. In this way, 24.5 g. of crystals (yield: 72%) are obtained: long white needles melting at 139–140° C. (non-corrected).

*Analysis.*—Molecular weight: Calculated for

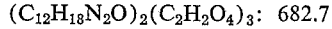

$(C_{12}H_{18}N_2O)_2(C_2H_2O_4)_3$: 682.7

Found by titration of the base: 680; found by titration of the oxalic acid: 637.

The same salt is obtained, but with lower yields, when mixing equimolecular amounts of acid and base.

(b) With fumaric acid.

The fumarate of 1-(2-oxo-1-pyrrolidino) 4-(1-pyrrolidino)-but-2-yne is obtained as in Example 4a by replacing the oxalic acid (7.4 g., 0.15 mole). Yield: 65–70%. White needles melting at 106° C. (non-corrected).

*Analysis.*—Molecular weight: Calculated for

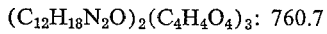

$(C_{12}H_{18}N_2O)_2(C_4H_4O_4)_3$: 760.7

Found by titration of the base: 766; found by titration of the fumaric acid: 768.

Having now described my invention what I claim as new and desire to secure by Letters Patent is:

1. Process of preparing 1-(2-oxo 1-pyrrolidino) 4-(1-pyrrolidino)-but-2-yne comprising condensing at a temperature between about −80° C. and +25° C. an ester of propargyl alcohol selected from the halides and sulfonates with an alkali metal derivative of pyrrolidone, said ester of propargyl alcohol and said alkali metal derivative being added to each other at a temperature not exceeding 0° C., and thereafter condensing the N-propargyl pyrrolidine thus obtained with a source of formaldehyde selected from the group consisting of gaseous formaldehyde, the aqueous solutions of formaldehyde and the polymers of formaldehyde having low molecular weight and pyrrolidine in the presence of copper ions.

2. Process as claimed in claim 1, wherein said condensation of the ester of propargyl alcohol with the alkali metal derivative of pyrrolidone is carried out in an anhydrous organic solvent.

3. Process as claimed in claim 1, wherein said copper ions are obtained by addition of a copper salt.

4. Process as claimed in claim 1, wherein said copper ions are obtained by addition of a copper oxide.

5. Process of preparing 1-(2-oxo 1-pyrrolidino) 4-(1-pyrrolidino)-but-2-yne comprising condensing at a temperature between about −80° C. and+25° C. an ester of propargyl alcohol selected from the halides and sulfonates with an alkali metal derivative of pyrrolidone, said ester of propargyl alcohol and said alkali metal derivative being added to each other at a temperature not exceeding 0° C., and thereafter condensing the N-propargyl pyrrolidone thus obtained with a source of formaldehyde selected from the group consisting of gaseous formaldehyde, the aqueous solutions of formaldehyde and the polymers of formaldehyde having low molecular weight and pyrrolidine in the presence of a catalyst constituted by a copper compound capable of liberating copper ions, said copper compound being selected from the group consisting of acetate, basic acetate, bromide, chloride, ammoniacal chloride, formate, nitrate, oxide, sulfate and p.toluene-sulfonate of copper II and acetate, bromide, chloride, cyanide, iodide and thiocyanate of copper I.

6. Process as claimed in claim 5, wherein 0.1–10% by weight of copper compound is employed relative to the N-propargyl pyrrolidone.

7. Process as claimed in claim 1, wherein N-propargyl pyrrolidone is converted into a crystalline adduct with an organic dicarboxylic acid selected from the group consisting of oxalic, malonic, succinic, glutaric, adipic, fumaric, maleic and tartaric acids, said adduct containing one mole of organic dicarboxylic acid and two moles of N-propargyl pyrrolidone and being condensed with said source of formaldehyde and pyrrolidine in the presence of said copper ions to obtain 1-(2-oxo 1-pyrrolidino) 4-(1-pyrrolidino)-but-2-yne.

8. Process as claimed in claim 1, wherein 1-(2-oxo 1-pyrrolidino) 4-(1-pyrrolidino)-but-2-yne is thereafter salified with a polycarboxylic acid selected from the group consisting of oxalic, malonic, succinic, glutaric, adipic, maleic, fumaric, tartaric, itaconic, citraconic and citric acids.

References Cited

UNITED STATES PATENTS 3,354,178  11/1967  Dickinson _____ 260—326.3

ALEX MAZEL, *Primary Examiner.*

J. A. NARCAVAGE, *Assistant Examiner.*

U.S. Cl. X.R.

260—326.5; 424—274